US010368689B2

(12) United States Patent
Rithener et al.

(10) Patent No.: US 10,368,689 B2
(45) Date of Patent: Aug. 6, 2019

(54) ADVANCED HEATING DEVICE

(75) Inventors: Blaise Rithener, La Tour-de-Peilz (CH); Youcef Ait Bouziad, Saint-Sulpice (CH); Alexandre Perentes, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 237 days.

(21) Appl. No.: 13/810,137

(22) PCT Filed: Jun. 24, 2011

(86) PCT No.: PCT/EP2011/060588
§ 371 (c)(1),
(2), (4) Date: Jan. 14, 2013

(87) PCT Pub. No.: WO2012/007260
PCT Pub. Date: Jan. 19, 2012

(65) Prior Publication Data
US 2013/0118359 A1 May 16, 2013

(30) Foreign Application Priority Data
Jul. 16, 2010 (EP) .................................... 10169766

(51) Int. Cl.
*A47J 31/56* (2006.01)
*A47J 31/54* (2006.01)
*A47J 31/40* (2006.01)

(52) U.S. Cl.
CPC ............. *A47J 31/56* (2013.01); *A47J 31/407* (2013.01); *A47J 31/545* (2013.01); *Y10T 29/49716* (2015.01)

(58) Field of Classification Search
CPC ........ A47J 31/407; A47J 31/545; A47J 31/56; Y10T 29/49716; C02F 5/00
(Continued)

(56) References Cited

U.S. PATENT DOCUMENTS 2,361,400 A * 10/1944 Holthouse ................ F23K 5/20
219/510
2,515,835 A * 7/1950 Preston ..................... F17C 9/02
137/341

(Continued)

FOREIGN PATENT DOCUMENTS

CH          593044       11/1977
CN         201299460      9/2009
(Continued)

OTHER PUBLICATIONS

International Search Report and Written Opinion dated Aug. 16, 2011 for Intl. Appln. No. PCT/EP2011/060588.

*Primary Examiner* — Dana Ross
*Assistant Examiner* — Ket D Dang
(74) *Attorney, Agent, or Firm* — K&L Gates LLP

(57) ABSTRACT

A beverage preparation machine is provided and includes a heater (1) for heating up a supply of liquid from a supply temperature to a beverage preparation temperature, in particular an in-line heater and/or a heat accumulation structure such as a thermoblock; and a control unit (2) for controlling the supply of liquid and the heater so that the heater is energized to reach and be maintained at an operative temperature ("RUN") for heating up the supply of liquid to the beverage preparation temperature during beverage preparation. The control unit is further arranged so that the heater is energized to reach and be maintained at a reduced temperature ("ECO") out of beverage preparation.

17 Claims, 3 Drawing Sheets

(58) Field of Classification Search
USPC ......... 29/401.1; 99/281, 295, 279, 285, 288,
99/294, 305, 309, 323.3, 290, 280, 282,
99/283, 289, 289 R, 291, 293, 298, 299,
99/310; 392/473, 492, 491, 489;
426/118, 122, 410
See application file for complete search history.

(56) References Cited

U.S. PATENT DOCUMENTS

| | | | | |
|---|---|---|---|---|
| 2,651,707 | A * | 9/1953 | Jepson | 219/441 |
| 3,357,339 | A * | 12/1967 | Schaab | A47J 31/408 |
| | | | | 99/283 |
| 3,443,508 | A * | 5/1969 | Reynolds et al. | 99/282 |
| 3,530,276 | A * | 9/1970 | Wells | A47J 31/56 |
| | | | | 219/441 |
| 3,628,344 | A * | 12/1971 | King | A23F 5/30 |
| | | | | 62/541 |
| 3,681,566 | A * | 8/1972 | Sellers | F24H 1/46 |
| | | | | 126/343.5 A |
| 3,787,659 | A * | 1/1974 | Olland | A47J 31/56 |
| | | | | 222/146.5 |
| 3,898,428 | A * | 8/1975 | Dye | A47J 31/545 |
| | | | | 165/156 |
| 4,033,248 | A * | 7/1977 | DiSalino | A47J 31/06 |
| | | | | 99/281 |
| 4,237,560 | A * | 12/1980 | Riegelman | E03D 9/08 |
| | | | | 219/217 |
| 4,242,568 | A * | 12/1980 | Wunderlin et al. | 392/397 |
| 4,309,940 | A * | 1/1982 | Lowerre, Jr. | 99/281 |
| 4,595,131 | A | 6/1986 | Ruskin et al. | |
| 4,700,052 | A | 10/1987 | Wolf et al. | |
| 4,835,365 | A * | 5/1989 | Etheridge | H05B 3/06 |
| | | | | 200/61.52 |
| 4,880,535 | A * | 11/1989 | Burrows | B01D 61/08 |
| | | | | 137/562 |
| 4,917,005 | A * | 4/1990 | Knepler | 99/280 |
| 5,014,611 | A | 5/1991 | Illy et al. | |
| 5,019,690 | A * | 5/1991 | Knepler | A47J 27/21008 |
| | | | | 219/400 |
| 5,265,318 | A * | 11/1993 | Shero | B23P 11/025 |
| | | | | 15/321 |
| 5,285,717 | A * | 2/1994 | Knepler | 99/282 |
| 5,392,694 | A | 2/1995 | Muller et al. | |
| 5,644,972 | A * | 7/1997 | Dahmen | A47J 31/007 |
| | | | | 426/433 |
| 5,865,097 | A * | 2/1999 | Smit | A47J 31/56 |
| | | | | 222/146.5 |
| 5,868,062 | A * | 2/1999 | Enomoto | A47J 31/002 |
| | | | | 99/282 |
| 5,943,472 | A | 8/1999 | Charles et al. | |
| 6,246,831 | B1 * | 6/2001 | Seitz | F24H 9/2021 |
| | | | | 219/483 |
| 6,393,967 | B2 * | 5/2002 | Fischer | 99/285 |
| 6,800,181 | B1 * | 10/2004 | Accattato | B08B 3/00 |
| | | | | 204/224 M |
| 6,889,598 | B2 | 5/2005 | Wroblewski | |
| 7,279,660 | B2 * | 10/2007 | Long et al. | 219/441 |
| 7,286,752 | B2 | 10/2007 | Gourand | |
| 7,503,287 | B2 * | 3/2009 | Friedrich | 122/14.22 |
| 7,730,830 | B2 * | 6/2010 | Kaneko | A21B 3/04 |
| | | | | 206/451 |
| 2006/0175351 | A1 | 8/2006 | Reddy | |
| 2007/0012685 | A1 * | 1/2007 | Gourand | A47J 31/542 |
| | | | | 219/628 |
| 2007/0259085 | A1 * | 11/2007 | Kodden et al. | 426/433 |
| 2007/0272085 | A1 * | 11/2007 | Ghassemlou | A47J 31/005 |
| | | | | 99/282 |
| 2008/0000358 | A1 * | 1/2008 | Goeckner et al. | 99/281 |
| 2008/0044533 | A1 * | 2/2008 | Nagaoka et al. | 426/395 |
| 2008/0260927 | A1 * | 10/2008 | Steenhof et al. | 426/569 |
| 2008/0277083 | A1 * | 11/2008 | Shevchenko | D21C 3/226 |
| | | | | 162/48 |
| 2009/0000488 | A1 * | 1/2009 | Magg | A47J 31/545 |
| | | | | 99/281 |
| 2009/0154909 | A1 | 6/2009 | Meyer | |
| 2009/0183637 | A1 * | 7/2009 | Nijboer | A47J 31/40 |
| | | | | 99/275 |
| 2009/0258114 | A1 * | 10/2009 | Lassota et al. | 426/78 |
| 2010/0282841 | A1 | 11/2010 | Deuber et al. | |

FOREIGN PATENT DOCUMENTS

| | | | |
|---|---|---|---|
| DE | 19711291 | 9/1998 | |
| DE | 19737694 | 10/1998 | |
| DE | 19732414 | 2/1999 | |
| DE | 10322034 | 12/2004 | |
| EP | 0485211 | 5/1992 | |
| EP | 1380243 | 1/2004 | |
| EP | 1634520 | 3/2006 | |
| EP | 1646305 | 9/2007 | |
| EP | 1859713 | 11/2007 | |
| EP | 1859714 | 11/2007 | |
| EP | 2027799 A1 | 2/2009 | |
| FR | 2799630 A1 | 4/2001 | |
| JP | S5766305 | 4/1982 | |
| JP | S58169820 | 10/1983 | |
| JP | H1118951 | 1/1999 | |
| JP | H11244145 | 9/1999 | |
| JP | H11318711 | 11/1999 | |
| JP | H11354253 | 12/1999 | |
| JP | 2000342451 | 12/2000 | |
| JP | 2002238766 | 8/2002 | |
| JP | 3801149 | 7/2006 | |
| JP | 3801150 | 7/2006 | |
| JP | 2007044289 | 2/2007 | |
| JP | 3903950 | 4/2007 | |
| JP | 3903958 | 4/2007 | |
| JP | 2009089732 | 4/2009 | |
| WO | 01/54551 A1 | 8/2001 | |
| WO | 2004/006742 | 1/2004 | |
| WO | 2005/004683 | 1/2005 | |
| WO | 2007039683 | 4/2007 | |
| WO | 2007/135136 | 11/2007 | |
| WO | 2009/043630 | 4/2009 | |
| WO | 2009/043865 | 4/2009 | |
| WO | 2009043851 | 4/2009 | |
| WO | WO 2009043630 A2 * | 4/2009 | ......... A47J 31/3628 |
| WO | 2009/074550 | 6/2009 | |
| WO | 2009/092745 | 7/2009 | |
| WO | 2009/130099 | 10/2009 | |

* cited by examiner

US 10,368,689 B2

ADVANCED HEATING DEVICE

CROSS REFERENCE TO RELATED APPLICATIONS

The present application is a National Stage of International Application No. PCT/EP2011/060588, filed on Jun. 24, 2011, which claims priority to European Patent Application No. 10169766.2, filed Jul. 16, 2010, the entire contents of which are being incorporated herein by reference.

FIELD OF THE INVENTION

The present invention concerns a heating device with a thermoblock and a control unit. In particular, the heating device is arranged to be incorporated into a beverage preparation machine.

For the purpose of the present description, a "beverage" is meant to include any liquid food, such as tea, coffee, hot or cold chocolate, milk, soup, baby food, hot water or the like. A "capsule" is meant to include any pre-portioned beverage ingredient within an enclosing packaging of any material, in particular an air tight packaging, e.g. plastic, aluminum, recyclable and/or bio-degradable packaging and of any shape and structure, including soft pods or rigid cartridges containing the ingredient.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir via different silicone hoses, which are joined using clamping collars.

EP 1 646 305 discloses a beverage preparation machine with a heating device that heats circulating water which is then supplied to the inlet of a brewing unit. The brewing unit is arranged to pass heated water to a capsule containing a beverage ingredient for its brewing. The brewing unit has a chamber delimited by a first part and a second part movable relative to the first part and a guide for positioning a capsule in an intermediate position between the first and second parts before moving the first and second parts together from an open to a closed configuration of the brewing unit.

In-line heaters for heating circulating liquid, in particular water are also well known and are for example disclosed in CH 593 044, DE 103 22 034, DE 197 11 291, DE 197 32 414, DE 197 37 694, EP 0 485 211, EP 1 380 243, EP 1 634 520, FR 2 799 630, U.S. Pat. Nos. 4,242,568, 4,595,131, 4,700,052, 5,019,690, 5,392,694, 5,943,472, 6,246,831, 6,393,967, 6,889,598, 7,286,752, WO 01/54551 and WO 2004/006742.

One problem with heaters for heating water in beverage machines lies in the operating temperature, i.e. usually close to the boiling temperature of water, that favours scale deposition from the water in the heating device. Especially in-line heaters having a heated duct or channel for quickly heating up circulating water are exposed to such scale depositions that may end up clogging the in-line heater. This problem is of particular relevance with thermoblocks that are widely used in beverage preparation machines.

A solution to this problem has been provided with descaling procedures during which a descaling agent is circulated in the machine's fluid circuit. However, such a procedure may last a significant period of time, e.g. 0.5 to a few hours, and requires the attention of the user or of a service person.

Thermoblocks are in-line heaters through which a liquid is circulated for heating. They comprise a heating chamber, such as one or more ducts, in particular made of steel, extending through a (massive) mass of metal, in particular made of aluminium, iron and/or another metal or an alloy, that has a high thermal capacity for accumulating heat energy and a high thermal conductivity for the transfer the required amount of the accumulated heat to liquid circulating therethrough whenever needed. Instead of a distinct duct, the thermoblock's duct may by a through passage that is machined or otherwise formed in the duct's body, e.g. formed during a casting step of the thermoblock's mass. When the thermoblock's mass is made of aluminium, it is preferred, for health considerations, to provide a separate duct, for example of steel, to avoid contact between circulating liquid and aluminium. The block's mass can be made of one or several assembled parts around the duct. Thermoblocks usually include one or more resistive heating elements, for instance discrete or integrated resistors, that convert electrical energy into heating energy. Such resistive heating elements are typically in or on the thermoblock's mass at a distance of more than 1 mm, in particular 2 to 50 mm or 5 to 30 mm, from the duct. The heat is supplied to the thermoblock's mass and via the mass to the circulating liquid. The heating elements may be cast or housed into the metal mass or fixed against the surface of the metal mass. The duct(s) may have a helicoidal or another arrangement along the thermoblock to maximise its/their length and heat transfer through the block.

To be operative to heat-up circulating water from room temperature to close to the boiling temperature, e.g. to 98° C., a thermoblock needs to be preheated, typically for 1.5 to 2 minutes. To reduce the waiting time between two consecutive beverage preparation cycles, such a thermoblock is maintained at its operative temperature. However, such a process consumes a significant amount of energy to be ready at any time, especially when successive beverages are requested with significant time gaps between them. With the trend to more environmentally friendly appliances and energy saving, beverage preparation machines include timers for shutting of the machines or entering a standby mode automatically, for instance as discussed in WO 2009/092745 and in EP 09168147.8.

Instant heating heaters have been developed and marginally commercialised in beverage preparation machines. Such heaters have a very low thermal inertia and a high power resistive heater, such as thick film heaters. Examples of such systems can be found in EP 0 485 211, DE 197 32 414, DE 103 22 034, DE 197 37 694, WO 01/54551, WO 2004/006742, U.S. Pat. No. 7,286,752 and WO 2007/039683.

These instant heaters are however expensive and require a sophisticated and highly accurate control system to avoid local hot spots. An accurate control of the power of such heaters is difficult to achieve without coming into conflict with flicker standards.

Thus, there is still a need to provide a simple, ecological, inexpensive and reliable heating system for a machine for preparing hot beverages, such as tea or coffee.

SUMMARY OF THE INVENTION

A preferred object of the invention is to provide a convenient heater and control system for a beverage preparation machine that alleviates at least some of the abovementioned problems.

Therefore, the present invention relates to a beverage preparation machine. Such machine comprises: a heater for heating up a supply of liquid from a supply temperature to a beverage preparation temperature, in particular an in-line heater and/or a heat accumulation structure such as a thermoblock; and a control unit for controlling the supply of liquid and the heater so that the heater is energised to reach and be maintained at an operative temperature for heating up the supply of liquid to the beverage preparation temperature during beverage preparation.

"Beverage preparation" typically refers to a series of steps executed automatically by the beverage preparation machine for carrying out a beverage request usually made by a user, e.g. to dispense a requested amount of beverage for filling a user-cup or a user-mug up to a desired level. Such steps include in particular processing the user-requested amount of beverage, e.g. corresponding to a cup or mug, and dispensing the beverage via a beverage outlet to an area for placing a user-cup and/or a user-mug. The processing of the amount of beverage may including heating an amount of liquid such as water, e.g. carrier liquid, and mixing the liquid with another ingredient, such as a flavouring ingredient (e.g. chocolate, soup, soluble coffee, soluble tea or milk), and/or infusing the ingredient with the liquid (e.g. ground coffee or tea leaves), with or without the aid of pressure, in particular involving the use of a pump. A "beverage preparation" typically ends when an amount of beverage requested by a user at a given point in time has been processed and dispensed to the user. Such end of processing and/or dispensing may correspond to the end of circulation of liquid through the beverage preparation machine or the end of dispensing of the beverage via a dispensing arrangement, e.g. a beverage outlet, of the beverage preparation machine. In particular, to account for machine routines at circulation end, in particular beverage related tests, or safety or ergonomic process (e.g. scale or hygiene tests), or other reasons, the "beverage preparation" may extend by a few seconds or tens of seconds beyond the actual circulation and dispensing of beverage so that end of "beverage preparation" is slightly delayed relative to the end of beverage circulation and/or dispensing following a beverage user-request.

The machine may have a fluid circuit for circulating the liquid, e.g. water, from a source, such as a liquid reservoir or the tap, to a beverage outlet. The above heater is typically in fluid connection with the fluid circuit. A pump may be incorporated in the fluid circuit for promoting the circulation of liquid therethrough. Such a pump may be controlled by the control unit.

Typically, the machine is configured for preparing coffee, tea, chocolate or soup. In particular, the machine can be arranged for preparing within a beverage module a beverage by passing hot or cold water or another liquid through a flavouring ingredient in the module, e.g. a flavouring ingredient held in a mixing and/or brewing unit. For instance, the flavouring ingredient is supplied within a capsule to the module. Such capsule typically forms a packaging that delimits an inner cavity for containing an ingredient of the beverage to be prepared, such as ground coffee or tea or chocolate or cacao or milk powder. Hence, an ingredient used for the beverage preparation can be introduced into the machine in a pre-portioned form with the aid of a capsule, i.e. a packaging for holding and containing the ingredient.

In accordance with the invention, the control unit is arranged so that the heater is energised to reach and be maintained at a reduced temperature out of beverage preparation.

Hence, when the heater is not used for a preparation of a beverage, the heater is allowed to cool down to a reduced temperature. The heater may be allowed to cool down to this reduced temperature immediately after the end of a beverage preparation, e.g. once the heater has delivered the required amount of heated liquid for the preparation of a beverage or once the beverage preparation machine has delivered the amount of requested beverage, e.g. a cup or a mug or shortly thereafter, e.g. a few seconds or tens of seconds such as one or two minutes. Especially when a brewing step takes place, end of beverage dispensing may occur after the end of circulation.

In a particularly simple embodiment of the invention, when the beverage preparation machine uses pre-portioned beverage ingredients supplied in capsules, the above "beverage preparation" may be equated with a presence in the machine of such a capsule in a disposition for dispensing a beverage using this capsule, e.g. an ingredient capsule located in a brewing unit of the beverage machine, whether or not liquid is actually circulated or beverage actually dispensed. In this case, it is sufficient to monitor the presence or the absence of a capsule in a dispensing configuration in the machine. This can even be done automatically.

At the end of beverage preparation, the heater is so energised for maintaining the heater at the reduced temperature. The temperature drop between the operative temperature and the reduced temperature may be achieved by disconnecting the powering of the heater via the control unit. Thereafter, the heater may be powered at an appropriate level to maintain the heater at the reduced temperature. For a further beverage preparation, the heater is first brought to the operative temperature, from the Thereby, the energy consumption of the heater is significantly reduced between two consecutive beverage preparations compared to a system continuously maintaining the heater at the operative temperature for an extended period of time. Moreover, the heat up time of the heater to reach its operative temperature from the reduced temperature is also smaller than the heat up time required for heating the heater that has been allowed to cool down completely by being shut down. Furthermore, when the heater has an operative temperature close to the boiling temperature of the liquid, e.g. water, scale deposition in the heater may already be reduced significantly by reducing the temperature of the heater by a few degrees.

For instance, the operative temperature of the heater is in the range of 65 to 98° C., in particular in the range of 85 to 95° C. For preparing a coffee, e.g. an espresso, the temperature of delivered beverage may be in the range of 80 to 90° C. To account for temperature loss downstream the heater, e.g. during infusion, the heater may have to heat the circulated water up to 85 to 95° C. or more. Tea may be best at a temperature of 60 to 95° C. Likewise, to account for the temperature loss during downstream the heater, e.g. during infusion, the heater may have to heat the circulated water from 65 to 98° C.

Normally, the reduced temperature is below the operative temperature, e.g. as mentioned above, and above a temperature of inactivity of the heater such as above an ambient temperature, e.g. in the range of 10 to 30° C.

The reduced temperature may be in the range of 50 to 95% of the operative temperature relative to the inactive temperature, such as 60 to 90% optionally 70 to 85%. For instance, when the inactive temperature is of 20° C. (ambient temperature) and the operative temperature of 90° C., the temperature span therebetween is of 70° C. and thus 50 to 95% thereof corresponds to a temperature difference of 35 to 66.5° C. and hence the corresponding reduced temperature (at 50 to 95% of the operative temperature of 90° C. relative to the inactive temperature of 20° C.) is in the range of 20+35° C. to 20+66.5° C., i.e. of 55° C. to 86.5° C.

The reduced temperature may be 3 to 50° C. below the operative temperature, in particular 5 to 35° C. below the operative temperature.

In one embodiment the reduced temperature is at such a level to substantially prevent scale deposition in the heater. The reduced temperature may be below 90° C., in particular in the range of 80° C. to 89° C. such as 84 to 88° C.

Scale deposition in a water circuit predominantly occurs when water turns into steam. At this point minerals present in water precipitate in the circuit. In order to prepare for example an optimum coffee, water may be heated at about 95° C. which is very close to the water boiling point at 100° C. or lower depending on the environment (e.g. atmospheric pressure).

By reducing the temperature of the heater by a few degrees, e.g. around 85 to 90° C., boiling of the water is substantially prevented and scale deposition effectively inhibited. With a state of the art beverage machine using a thermoblock, e.g. of about 1 to 1.5 kW, the temperature reduction, e.g. from 94 to 88° C., may take about 1 minute after cut-off of the thermoblock, in particular at the end of a beverage preparation.

For instance, the reduced temperature is below 90° C. in particular below 85° C. When the operative temperature is close to the boiling temperature, e.g. about 90 to 99° C., reducing the temperature in the heater of even a few degrees only, reduces significantly the risk of scale deposition, in particular in heaters that have a non-even heat distribution in their heating cavity. Non-even heat distribution may lead to "hot spots" with an increased risk of scale deposition at such spots. Hence, reducing the temperature of the heater overall by at least a couple of degrees of more reduces, inhibits or even prevents to a substantial extent any scale deposition during a period of no beverage preparation.

In another embodiment, the control unit includes a service mode that is enabled upon reaching the reduced temperature. The reduced temperature can be in the range of 55 to 75° C., especially when the operative temperature is in the range of 80 to 98° C. Cleaning and/or descaling may be carried out at a temperature in the range of 50 to or 70° C. The reduced temperature can be set to the temperature required for cleaning and/or descaling, e.g. 50 to 65 or 70° C. or may be set between such a temperature and the operative temperature, so that the heating up of the heater from the reduced temperature to the operative temperature is reduced. In the latter case, the heater may be allowed to cool down from the reduced temperature, e.g. 65 to 80° C., to the service temperature, e.g. 50 to 65 or 70° C., if servicing is needed and/or requested.

The descaling and/or cleaning may typically involve circulating, e.g. with the aid of the machine's pump, a volume of cleaning and/or descaling liquid in the range of 250 to 1000 ml, such as 400 to 750 ml. The liquid may be circulated continuously or may involve some interruptions of the flow.

Descaling may be carried out at a higher temperature, above 70 to 75° C. However, some descaling agents tend to evaporate at higher temperatures any may generate toxic gases.

Rinsing of the machine's liquid circuit, in particular of the heater, is preferably carried out at the reduced temperature, so that on the one hand less energy is required in the heating up of the rinsing liquid and on the other hand the rinsing liquid is less likely to deposit scale especially in the heater. The rinsing may involve a pulsed flow of rinsing liquid.

The reduced temperature level may be factory set and/or may be selectable or modifiable by a user, namely a consumer and/or a service person. In particular, the machine may include an arrangement, e.g. a user-interface, for allowing a user to set the reduced temperature in a temperature range of 45 to 90° C., such as 55 to 85° C., optionally 60 to 80° C. A user-interface for setting the reduced temperature level in a temperature range may be associated with a means for providing to the user an indication as to an economy of energy for a selected reduced temperature and/or time required to bring the heater from the selected reduced temperature to the operative temperature. The means may be an numeric or symbolic indication adjacent to the interface or elsewhere so that the user may predict and weigh the environmental benefit and possible inconvenience related to heating up the heater from the reduced temperature to the operative temperature. It follows that the ergonomy of use, environmental awareness and incentive to take advantage of the possibility provided in connection with the reduced temperature, are increased.

It is also contemplated to allow a user to deactivate the heater's faculty to be driven down at a reduced temperature when the machine is switched on but not preparing a beverage.

Generally speaking, "beverage preparation" may be initiated by a user-request, e.g. via an appropriate interface such as a switch, button, touch pad or screen; and/or ended when supply of liquid to the heater is stopped at beverage preparation end or when dispensing of beverage is ended.

Beginning and end of "beverage preparation" may be associated with a particular configuration and/or features of the beverage preparation machine.

The machine may comprise an arrangement for mixing and/or brewing one or more beverage ingredients. In particular, the mixing and/or brewing arrangement may have: a configuration for loading and/or unloading an ingredient; and a configuration for mixing and/or brewing such ingredient. Such arrangements are well known in the art. Suitable mixing and/or brewing arrangements are for example disclosed in EP 1 646 305, EP 1 859 713, EP 1 859 714, WO 2009/043630 and in EP 09172187.8, the contents of which are hereby incorporated by way of reference.

The control unit may be arranged so that the heater is so energised to reach and be maintained at the operative temperature on occurrence of at least one event selected from: the mixing and/or brewing arrangement is in a loading configuration; the mixing and/or brewing arrangement is loaded with an ingredient; and an ingredient is sensed in the mixing and/or brewing arrangement.

Setting as a starting point of beverage preparation a particular configuration, preferably detected automatically, of the mixing and/or brewing unit indicative of an imminent need to heat up the liquid for dispensing a beverage, helps to save time for bringing the heater to the operative temperature.

Automatic detection of an ingredient and/or a capsule of the ingredient in the mixing and/or brewing arrangement may be used as a starting point of the beverage preparation with such ingredient. As a consequence, the control unit will not wait until the user operates a beverage dispensing interface, e.g. a button for dispensing a small or a large cup, on the beverage preparation machine to bring the heater to its operative temperature.

Likewise, the control unit can be arranged so that the heater is so energised to reach and be maintained at the reduced temperature on occurrence of at least one event selected from: the mixing and/or brewing arrangement is in an unloading configuration; an ingredient is unloaded from the mixing and/or brewing arrangement; and an absence of an ingredient is sensed in the mixing and/or brewing arrangement, in particular when the arrangement is in a mixing and/or brewing configuration (e.g. the mixing and/or brewing arrangement is empty).

In a particular embodiment, the mixing and/or brewing arrangement can be configured for loading a capsule containing such ingredient, e.g. a flavouring ingredient such as ground coffee, tea, chocolate, soup, milk, etc. In particular, the control unit may comprise a sensor for automatically sensing a capsule in the mixing and/or brewing arrangement. Such sensors may be optical, radio-based as known in the art. For example, the capsule sensor is arranged to sense an electric characteristic of the capsule, for instance as disclosed in EP 10167463.8, the content of which is hereby incorporated by way of reference.

The automatic detection of an ingredient and/or a capsule of the ingredient in the mixing and/or brewing arrangement may be used as a starting point of the beverage preparation with such an ingredient. As a consequence, the control unit will not wait until the user operates a beverage dispensing interface, e.g. a button for dispensing a small or a large cup, on the beverage preparation machine to bring the heater to its operative temperature.

In one embodiment, an automatic detection of an ingredient and/or a capsule in the mixing and/or brewing arrangement is used to bring the heater to the operative temperature. A lack of detection of ingredient and/or a capsule in the mixing and/or brewing arrangement can be used as a point in time to bring the heater to its reduced temperature. An end of liquid circulation upon such a detection of an ingredient and/or capsule, may be used as a point in time for bringing the heater to its reduced temperature.

In another embodiment, an automatic detection of an ingredient and/or a capsule in the mixing and/or brewing arrangement as well as the mixing and/or brewing arrangement in a loading configuration are used to bring and maintain the heater in the operative temperature. A lack of detection of ingredient and/or a capsule in the mixing and/or brewing arrangement in the mixing and/or brewing configuration is then used as a point in time to bring the heater to its reduced temperature.

Moreover, the control unit can be further arranged to interrupt automatically powering of the heater to reach a temperature of steady inactivity, e.g. ambient temperature, when a shut-off condition and/or a standby condition is met. In addition to the interruption of the powering of the heater, the powering of other components of the beverage machine may be interrupted, for instance a pump or active sensors or other energy consuming components, e.g. an interface.

The invention also relates to a method of transforming a state of the art beverage preparation machine into a machine as described above. The state of the art machine comprises before transformation:

a heater for heating up a supply of liquid from a supply temperature to a beverage preparation temperature, in particular an in-line heater and/or a heat accumulation structure such as a thermoblock; and a control unit for controlling such supply of liquid and the heater so that the heater is energised to reach and be maintained at an operative temperature for heating up such supply of liquid to the beverage preparation temperature during beverage preparation.

In accordance with the invention, the control unit is so modified, in particular reprogrammed, that during use the heater is energised to reach and be maintained at a reduced temperature out of beverage preparation.

Hence, the invention can be implemented into existing beverage preparation machines with minimal costs and involves hardly any additional costs to be implemented into new built machines.

BRIEF DESCRIPTION OF THE DRAWINGS

The invention will now be described with reference to the schematic drawings, wherein.

DETAILED DESCRIPTION

Figure 1:
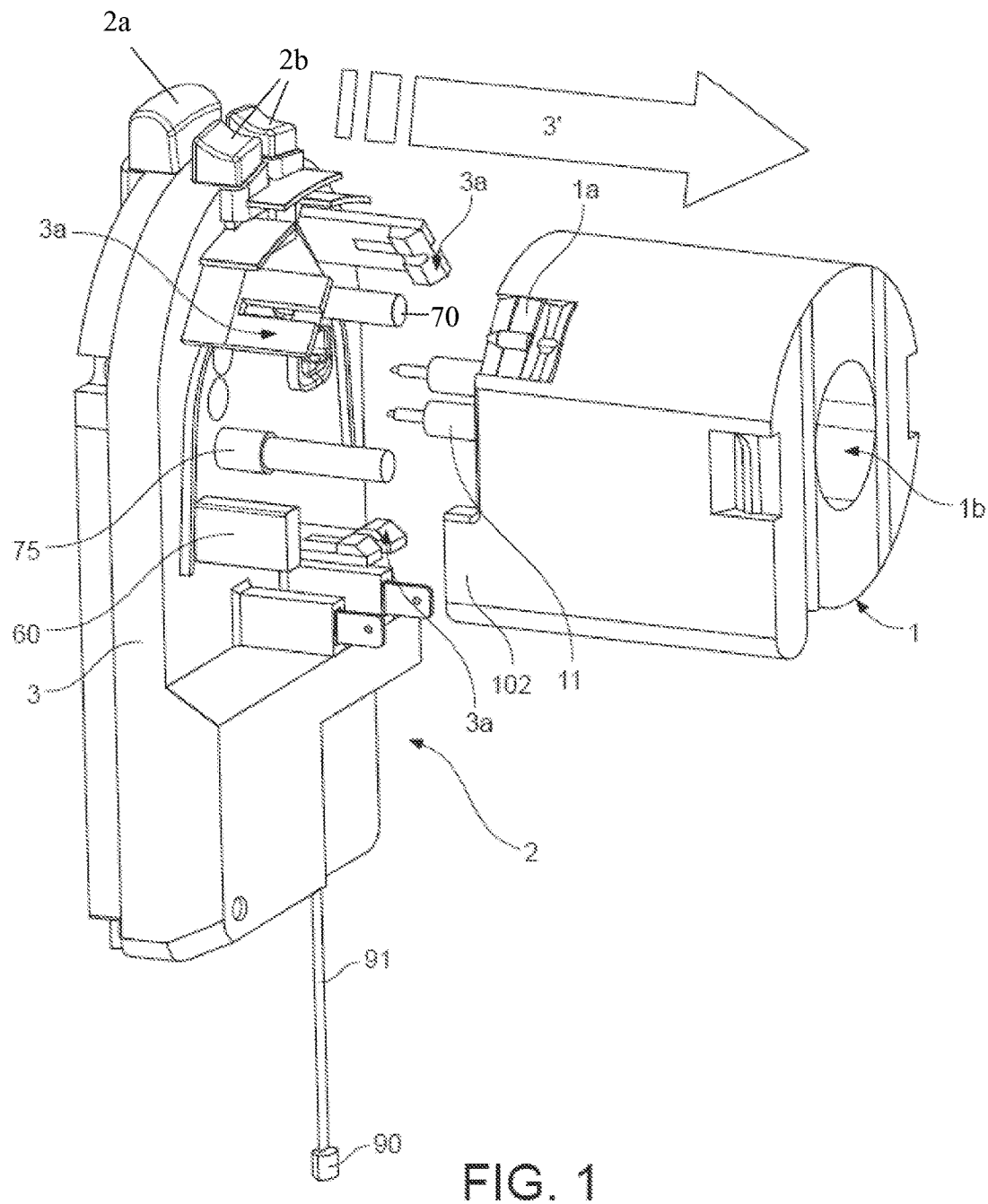
FIG. 1 shows a heating device comprising a thermoblock and a control unit for a beverage preparation machine according to the invention.

FIG. 1 shows an exploded view of a heating device of a beverage preparation machine according to the invention, in which liquid is circulated through a thermoblock and then guided into a brewing chamber for brewing a beverage ingredient supplied into the brewing chamber. An example of such a beverage machine is disclosed in detail WO 2009/130099, the content of which is hereby incorporated by way of reference.

For instance, a beverage ingredient is supplied to the machine in a capsule. Typically, this type of beverage machine is suitable to prepare coffee, tea and/or other hot beverages or even soups and like food preparations. The pressure of the liquid circulated to the brewing chamber may for instance reach about 2 to 25 bar, in particular 5 to 20 bar such as 10 to 15 bar.

For instance, the machine has a beverage preparation module that is arranged for circulating a liquid from a source via a flavouring ingredient to flavour the liquid so as to form the beverage. The beverage preparation module may be arranged to dispense the prepared beverage via a beverage outlet to a user-cup or a user-mug.

The beverage preparation module typically includes one or more of the following components:
a) a mixing and/or brewing arrangement, such as an ingredient holder, e.g. a brewing unit, for receiving the flavouring ingredient of this beverage, in particular a pre-portioned ingredient supplied within a capsule, and for guiding an incoming flow of liquid, such as water, through this ingredient to a beverage outlet;
b) an in-line heater, such as a thermoblock or another heat-accumulation heater, for heating this flow of liquid to be supplied to the ingredient holder;
c) a pump for pumping liquid through the in-line heater;
d) one or more fluid connecting members for guiding liquid from a source of liquid, such as a tank of liquid, to a beverage outlet;
e) an electric control unit, in particular comprising a printed circuit board (PCB), for receiving instructions from a user via an interface and for controlling the in-line heater and the pump; and
f) one or more electric sensors for sensing at least one operational characteristic selected from characteristics of the mixing and/or brewing arrangement, the in-line heater, the pump, the liquid reservoir, the ingredient collector, a flow of liquid, a pressure of liquid and a temperature of liquid, and for communicating such characteristic(s) to the control unit.

Examples of suitable brewing units and capsule management are disclosed in WO 2005/004683, WO2007/135136 and WO 2009/043630, which are hereby incorporated by way of reference. Suitable beverage preparation modules are for instance disclosed in WO 2009/074550 and WO 2009/130099, the contents of which are hereby incorporated by way of reference.

The heating device shown in FIG. 1 has a thermoblock with an aluminium metal mass 1 and a control unit 2 including a thermal and electrically insulating plastic housing 3 containing a printed circuit board 4, e.g. bearing one or more controllers, memory devices, etc. . . . . .

Metal mass 1 incorporates a water inlet, a water outlet and a water heating duct extending therebetween to form a free-flow passage (not shown) for guiding water circulating from a water reservoir via a pump (not shown) through metal mass 1.

Figure 2:
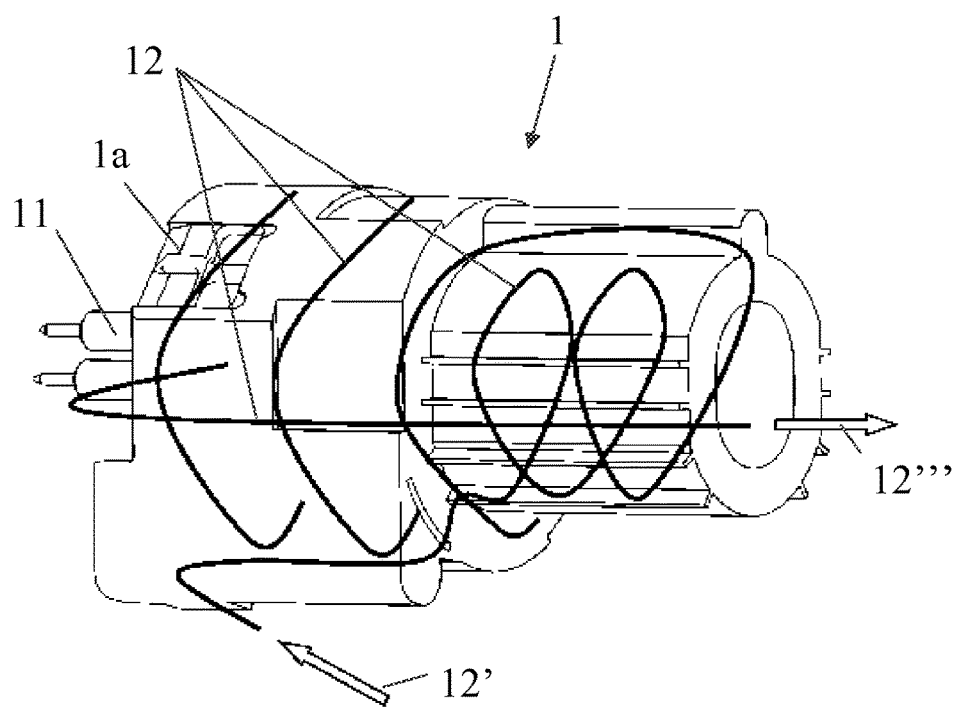
FIG. 2 illustrates a fluid circulation in a similar thermoblock.

As illustrated in FIG. 2, a thermoblock's mass 1 may include a heating duct 12. Heating duct 12 has an inlet 12' and an outlet 12'''.

Heating duct 12 may extend helicoidally through mass 1, in particular along a generally horizontal axis. Duct 12 may have upper flow portions followed by a down-coming flow portions. Such upper flow and down-coming flow portions of duct 12 may have a narrowed cross-section for promoting an increased velocity of water therealong to inhibit an accumulation of bubbles in such upper flow portion by pushing them down the down-coming flow portion by the flow of water with increased velocity. In this configuration, the duct is arranged so that the size of its cross-section changes along the chamber, to increase the flow velocity in areas, usually upper areas, which might otherwise serve to capture bubbles, in particular vapour bubbles. The increased liquid velocity in these areas "washes" all possible bubbles away from these areas with the fast flow of liquid in these areas. To avoid overheating in such areas with reduced cross-section, the heating power may be reduced on the corresponding parts of the heater, for instance, by adjusting the resistive means on these parts. In a variation, this duct has a reduced cross-section along its entire length to provide a sufficient velocity of the water flow for flushing possible vapour bubbles formed therein during heating. The heating duct 12 may be provided with different sections to influence the flow so that the thermal transfer is more evenly distributed and prevents local overheating and resulting bubble formation.

As illustrated in FIG. 1, metal mass 1 of the thermoblock further includes an opening 1b which forms or rigidly anchors an upstream part of the brewing chamber (not shown) so that the rigid passage of metal mass 1 extends into the brewing chamber. The beverage preparation machine also comprises a downstream part (not shown) having a beverage outlet and cooperating with the upstream part to form the brewing chamber, the downstream part and the upstream part can be arranged to be moved apart and moved together for the supply into the brewing chamber and the evacuation from the brewing chamber of the ingredient.

Typically, the upstream part of the brewing chamber that is integrated into the thermoblock, will be fixed in the beverage preparation machine and the downstream part of the brewing chamber will be movable, or vice versa. The brewing chamber may have a generally horizontal orientation, i.e. such a configuration and orientation that the water flows through the in the brewing chamber along a generally horizontal direction, and the upstream part and/or downstream part may be movable in the same or in the opposite direction of the water flow in the chamber. Embodiments of such a thermoblock and brewing chamber are for example disclosed in WO 2009/043630, the content of which is hereby incorporated by way of reference.

Control unit 2 is secured to metal mass 1 via snaps 3a of housing 3 that cooperate with corresponding recesses 1a in the surface of metal mass 1 when housing 3 is assembled to metal mass 1 in the direction of arrow 3'.

The two part housing 3 of control unit 2 encloses a printed circuit board (PCB) on all sides, in particular in a substantially impervious manner so as to protect the PCB against liquid and vapours in the machine. The two parts of housing 3 may be assembled by screws 3b or any other appropriate assembly means, such as rivets, gluing, welding, etc. . . . .

Control unit 2 includes a user interface with a master switch 2a and two control switches 2b that are connected via housing 3 to the PCB. It is of course possible to use more elaborated user interfaces including screens or touch screens. The PCB includes power connectors for supplying electric heating power to metal mass 1 via power pins 11 extending through corresponding openings in housing 3, further electrical connectors for one or more further electric devices of the beverage preparation machine, such as a user interface, pump, fan, valve, sensors, etc. . . . as required, and a connector to the mains for the central electric power supply.

The thermoblock receives electric components, namely a temperature sensor 70 connected to the PCB, a thermal fuses 75, a power switch in the form of a triac 60 in a cavity the opening of which is formed between protruding walls 102 and a heating resistor (not shown) with connector pins 11, that are rigidly secured into metal mass 1 and rigidly connected to the PCB. Furthermore, the PCB is electrically connected via a rigid connector or cable 91 to a hall sensor 90 of a flowmeter that is located on the water circuit of the beverage preparation machine, typically between a pump and a water or other liquid source such as a water or liquid reservoir, or between a pump and a heating device, or within the heating device.

Moreover, the PCB may carry a micro-controller or processor and possibly a quartz clock for controlling the intensity of current passed to resistive heating element based on the flow rate of the circulating water measured with the flow meter and the temperature of the heated water measured with the temperature sensor 70. Sensor 70 may be located within the thermoblock at a distance from the circulating water so as to provide an indirect measure of the water temperature. To increase the accuracy of the temperature control, one or more temperature sensors may be incorporated into metal mass 1 and/or into the brewing chamber and/or upstream the metal mass 1 or at its water inlet. The controller or processor may also control further functions of the liquid food or beverage preparation machine, such as a pump, a liquid level detector in a water supply reservoir, a valve, a user interface, a power management arrangement, an automatic beverage ingredient supplier such as an integrated coffee grinder or an automatic supplier of ingredient capsules or pods, etc. . . . .

Further details of the heating device and its integration in a beverage preparation machine are for example disclosed in WO 2009/043630, WO 2009/043851, WO 2009/043865 and WO 2009/130099, the contents of which are hereby incorporated by way of reference.

The invention will now be described with an emphasis on the temperature control of heater 1 via control unit 2.

Heater 1 is arranged for heating up a supply of liquid, e.g. circulating along heating duct 12, from a supply temperature to a beverage preparation temperature.

Control unit 2 is arranged for controlling this supply of liquid, e.g. via a pump, and heater 1 so that heater 1 is energised to reach and be maintained at an operative temperature for heating up the supply of liquid to the beverage preparation temperature during beverage preparation.

In accordance with the invention, control unit 2 is further arranged so that heater 1 is energised to reach and be maintained at a reduced temperature out of beverage preparation.

Figure 3:
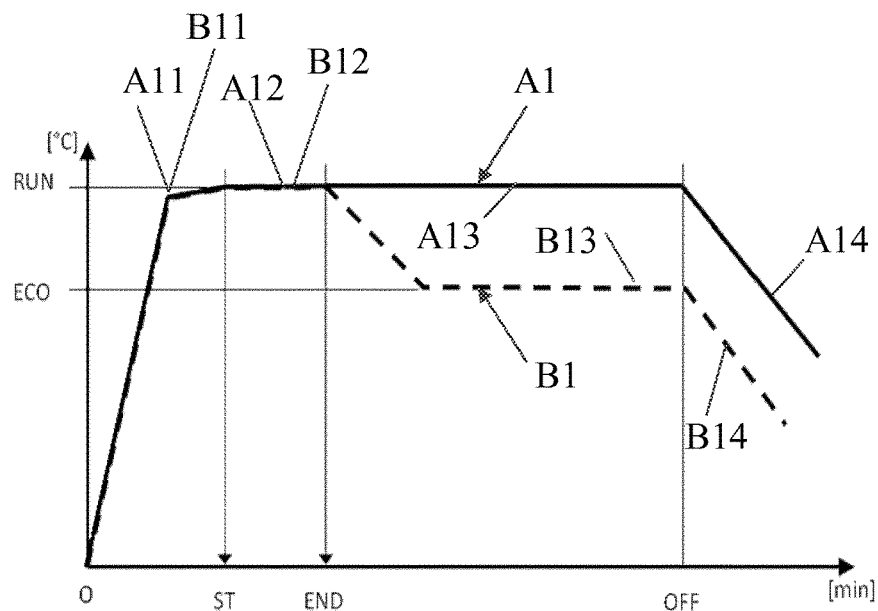
FIGS. 3 and 4, respectively, show comparative temperature profiles over time of a heater of a beverage preparation machine of the invention and of a state of the art beverage preparation machine.
Figure 4:
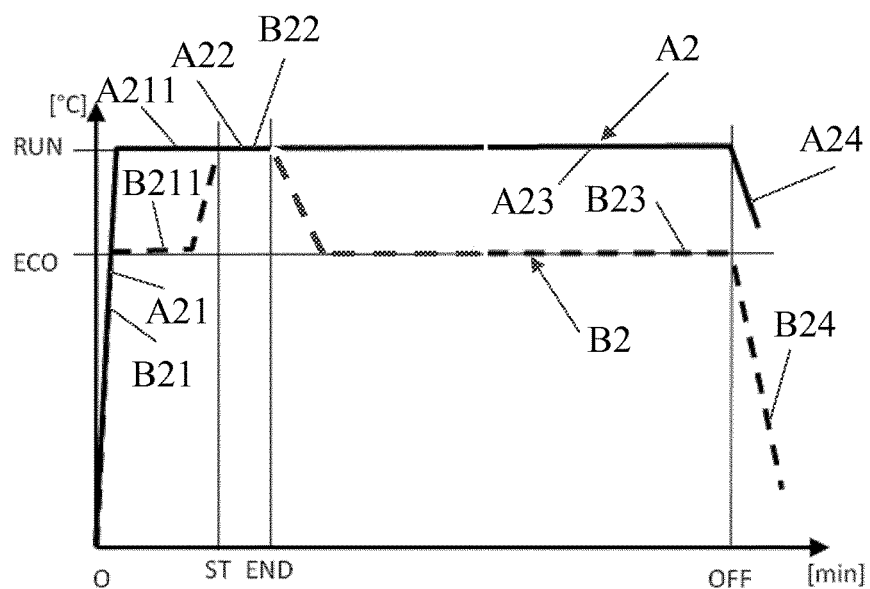

FIGS. 3 and 4 illustrate two temperature profiles B1,B2 (in dotted lines) of heater 1 over time when heater 1 is controlled by control unit 2 in accordance with the invention. In comparison temperature profiles A1,A2 (in continuous lines) correspond to the temperature of a heater of a state of the art beverage preparation machine.

Three levels of temperature are illustrated in FIGS. 3 and 4.

Level "0" represents the steady state temperature of heater 1 when disconnected or unpowered or in a standby mode. In this case, heater 1 is normally at ambient or room temperature, e.g. 5 to 45° C., typically in the range of 15 to 30° C.

Level "RUN" represents the operative temperature of heater 1 during beverage preparation. The heater is powered and controlled by control unit 2 to bring liquid in the heater to the right temperature for dispensing the beverage, e.g. around 85 to 88° C. for the dispensed coffee or 60 to 95° C. for dispensing tea. The temperature of the liquid delivered by the heater may be higher, typically by a few of degrees e.g. 89 to 92° C. for water destined to brew coffee, than the temperature of the dispensed beverage, e.g. 85 to 88° C. for dispensed coffee. Thereby, the temperature loss of the liquid circulating between the heater and the user-cup or user-mug into which the liquid is dispensed is taken into account for controlling the heater.

Level "ECO" represents the reduced temperature of heater 1 out of beverage preparation, i.e. when no beverage is prepared. This temperature level is comprised between level "0" and level "RUN".

The reduced temperature at level "ECO" is below the operative temperature (level "RUN") and above a temperature (level "0") of inactivity of the heater such as above an ambient temperature. As illustrated in FIGS. 3 and 4, the reduced temperature can be in the range of 50 to 95%, e.g. around 70 or 75%. For example, the reduced temperature can be at about 10 to 20° C. below the operative temperature, e.g. of 90 or 95° C.

The temperature (level "RUN") of the heater to deliver a liquid at the desired temperature may be slightly changing during beverage preparation to adapt for changes of the flow of liquid or variations of the thermal balance upstream the heater due to the passage of liquid at the supply temperature, that may be lower or higher than the initial temperature of the liquid circulation arrangement, upstream the heater.

FIG. 3 illustrates the temperature over time of thermoblock 1, e.g. with a power capacity of 1.2 kW, controlled by control unit 1 applying a state of the art thermal regulation system. Typically, this regulation system is a thermal loop regulation. For a coffee machine, the regulation system is designed for bringing about 20 to 100 ml water from room temperature, e.g. 15 to 25° C., to a temperature of about 90 to 94° C. for infusing ground coffee in a brewing unit.

The preheating period of the heater from room temperature to the operative temperature typically lasts from 1.5 to 2 min, e.g. with a slow final adjustment phase as illustrated at the end of the preheating curve A11,B11 up to the beverage start "ST". At the end of preheating curve A11, B11, beverage preparation can be initiated and extends over a beverage preparation duration between time "ST" and "END" depending on the volume of the beverage requested by the user. During this time, the heater is maintained at an operative temperature "RUN" that can be more or less stable over time as illustrated by curves A12,B12.

As illustrated in FIG. 3, beverage preparation starts immediate at the end of preheating. For instance, a request for preparing a beverage is made to the machine prior to the end of preheating and stored by the machine and then executed automatically by the machine at the end of preheating when temperature level "RUN" is reached. Such a system is generally described in EP 09168147.8, the content of which is hereby incorporated by way of reference.

When time "END" is reached, beverage preparation is ended. At this point in time, prior art heaters are maintained at a temperature level for immediate beverage delivery, typically at temperature level "RUN" as illustrated by curve A13. Conversely, heater 1 controlled by controller 2 is allowed to cool down to temperature "ECO", e.g. by disconnecting powering of heater 1, and then heater 1 is maintained by appropriate powering at temperature "ECO" inbetween temperatures "0" and "RUN" as illustrated by temperature curve B13.

After a certain period of time, that may be determined by a period of non-use of the machine measured by a timer triggered at the end of beverage preparation "END", the heaters may enter a standby or automatic shut off mode and allowed to cool down to temperature level "0" as illustrated by temperature curves A14,B14.

FIG. 4 illustrates another comparative temperature profile between a heating system according to the invention and a prior art heating system. The temperature over time of the heating system according to the invention is illustrated by curve B2. The prior art temperature evolution is illustrated by curve A2. The heating system according to the invention and of the prior art are similar to those associated with FIG. 3.

The time scale in FIG. 4 is compressed in comparison to the time scale of FIG. 3.

In contrast to the profile shown in FIG. 3, preparation of a beverage does not start immediately at the end of the start up period. The temperature curves at start up A21,B21 raise immediately from level "0" upon powering the heater.

In the case, of the state of the art heating system, the heater is brought to the operative temperature level "RUN" directly and remains at this level A211 until a beverage is requested at a point in time "ST" whereby the temperature of the heater is maintained at the same level as indicated by curve A22.

In contrast, the heater of the heating system in line with the invention is brought (as illustrated by curve B21) from level "0" to the reduced temperature level "ECO" and is maintained at this inferior temperature level as indicated by curve B211 until a beverage is requested. Once a beverage is requested the heater of the inventive system is brought from the reduced temperature "ECO" to the operative temperature level "RUN" for preparing a beverage as indicated by curve B22.

Thereafter, the heater systems of the invention and of the state art behave like those illustrated in the previous FIG. 3. Indeed, after beverage preparation at time "END", the state of the art heating system is maintained at the operative temperature as illustrated by curve A23 until a standby or shut-off process is initiated at point in time "OFF" when the powering of the heater is interrupted (curve A24). After beverage preparation, the inventive heating system has a temperature that is immediately allowed to drop to the reduced temperature level "ECO" and maintained at this level as illustrated by curve B23 until the standby or shut-off process is initiated (curve B24).

Suitable standby/shut-off systems are for example disclosed in WO 2009/092745 and in EP 09168147.8, the contents of which are hereby incorporated by way of reference.

Hence, in the illustrative and non-limitative examples shown in FIGS. 3 and 4, the state of the art heating system is maintained for an extended period of time at the operative temperature "RUN" even when no beverage preparation is carried out by the machine whereas the inventive heating system is brought to the operative temperature "RUN" only during the time necessary for preparing a beverage and maintained at a reduced temperature "ECO" when no beverage is being prepared.

The reduced temperature may serve to inhibit scale deposition in the heater in which case the temperature reduction does not need to be significant, e.g. 10 to 20° C. below the boiling temperature of the liquid heated by the heater, which may be 2 to 5 or 10° C. below the operative temperature of a heater of a coffee machine. This offers the advantage that scale deposition can be efficiently prevented while the time required to reach the operative temperature from the reduced temperature may be very short, e.g. 2 to 5 or 8 sec with a state of the art temperature regulation system.

When the difference between the operative temperature and the reduced temperature is small, e.g. less than 5 or 10° C., bringing the temperature from the reduced and the operative temperature may be sufficiently short, e.g. less than 3 or 5 sec, so that process can be hidden from the user. For instance, the machine may be arranged to detect an imminent beverage dispensing and bring the heater to the operative temperature without waiting for a beverage preparation request. Such an event may be an event normally preceding a beverage preparation request by a user, such as an introduction into the beverage machine of an ingredient, in particular portioned and/or contained within a capsule, and/or a user handling of a part of the machine, such as a brewing unit, e.g. opening of closing the machine.

For example, when the heater is controlled for being maintained at the reduced temperature, the control unit may monitor an introduction of a beverage ingredient and/or a user-handling of an ingredient chamber, such as a brewing unit. As soon as the control unit detects introduction of the beverage ingredient and/or user-handling of the ingredient chamber, the control unit may be arranged to bring the heater from the reduced temperature to the operative temperature without waiting for a user-request for a beverage preparation. If the time for bringing the heater from the reduced temperature to the operative temperature is sufficiently small, the heater may reach the operative temperature by the time the user requests a beverage. If the necessary time to reach the operative temperature is too long to be unnoticed by the user, the waiting time for the user is at least reduced.

The reduced temperature may further serve to reduce substantially the energy consumption between consecutive beverage preparations. In this case, the temperature may be allowed to drop over a greater extent, e.g. 15 to 30° C. In this case, the time required to reach the operative temperature is of course increased if the time span between two consecutive beverage preparations is sufficient for the temperature of the heater to drop to the predetermined reduced temperature. However, if consecutive beverage preparations are carried out in a narrow time span, the heater will not have time to reach the reduced temperature level and the time needed for bringing up the heater to the operative temperature will be limited accordingly.

Example

The invention can be implemented by reprogramming the control unit of an existing coffee machine, in particular a Nespresso™ coffee machine of the Citiz™ range which is commercialised and generally described in WO 2009/074550. The following energy savings can be achieved by providing such a reduced temperature level for the machine as compared to the consumption before modification of such a machine.

These exemplifications correspond to a Citiz™ coffee machine having a thermoblock heater of 1.2 kW with an aluminium heat accumulation mass of 330 g. The control unit is arranged to bring the heater to an operative temperature of 94° C. to deliver a coffee having a temperature after brewing of about 86 to 88° C. The machine can be tested at an ambient temperature (room temperature) at 20° C. This leads to a temperature span between ambient temperature and the operative temperature of 74° C. The pump of the machine provides a free-flow, i.e. in the absence of any coffee capsule in the machine's brewing unit, of 300 ml/min through the thermoblock.

The reduced temperature level of the machine can be set at 70° C. This corresponds to a temperature span of 50° C. relative to the ambient temperature (20° C.) and to a temperature span of 24° C. relative to the operative temperature, i.e. 30% below the operative temperature of 94° C. relative to the ambient temperature.

The machine with the inventive heater and controller will need about 15 min to reach the reduced temperature of 70° C. from 94° C., i.e. by disconnecting the heater. During this period of time, the state of the art machine will maintain its heater at 94° C. which will require 1.91 Wh. However, the state of the art machine will be immediately ready to heat up water for preparing a beverage whereas the inventive machine will first have to bring the heater from the reduced temperature to the operative temperature. This latter operation will need 20 to 30 sec of pre-heating. The same duration will be needed for a longer time of inactivity since the reduced temperature will be maintained at 70° C. However, if the time between two beverage preparations is below 15 min the temperature of the heater will not have time to drop to 70° C. and the time for reheating to the operative temperature is correspondingly shorter. For instance, for a period of inactivity of 5 min, the time for reheating will be of 6 to 10 sec.

The time needed for bringing the heaters of the state of the art machine and of the inventive machine from ambient temperature to 94° C. is of about 1.5 min in each case.

The time delays may be shortened significantly by optimising the heating algorithm and by reducing the mass of the heater. In particular a state of the art heating algorithm may be enhanced with a predictive or even self-learning system, e.g. as disclosed in EP 10166366.4. In this case, the times delays may be divided by a factor two to four.

When the machine is switched on and is not preparing any beverage for an hour, the state of the art heater and control unit, i.e. the state of the art heating device, lead to an additional consumption of 2.3 Wh, i.e. a total consumption of 7.65 Wh for the state of the art heating device and of 5.35 Wh for the inventive heating device, which represents about 30% energy savings due to the implementation of the present invention.

When a rinsing cycle with an amount of water of water of 240 ml is carried out, the state of the art heating device will heat up the water to 94° C. via the heater whereby 20.1 Wh will be used, whereas the inventive heating device will heat up the water to 70° C. whereby 14.1 Wh will be needed. Hence, once again, an energy saving of 30% can be made by using the inventive heating device instead of a state of the art heating device.

If a coffee is prepared during a period of time of min, the state of the art heating device and the inventive heating device will need the same amount of energy for heating the water. However, the state of the art heating device will need much more energy than the inventive heating device when no beverage is being prepared: the state of the art heating device will remain in a state of permanent readiness for beverage preparation whereas the inventive heating device will permit energy savings of 3.1 Wh, i.e. 23% of the energy needed by the state of the art heating device.

The invention claimed is:

1. A beverage preparation machine comprising:
   an in-line heater for heating a supply of liquid from a supply temperature to a beverage preparation temperature, the in-line heater is a thermoblock comprising a heating duct by which the supply of liquid travels through the thermoblock;
   a control unit for controlling the supply of liquid and the in-line heater so that the in-line heater is energized to reach and be maintained at an operative temperature for heating the supply of liquid to the beverage preparation temperature during beverage preparation, the control unit is arranged so that the in-line heater is energized to reach and be maintained at a reduced temperature below the operative temperature, below a boiling temperature of the supply of liquid, and above a temperature of inactivity of the in-line heater when the beverage preparation machine is not preparing a beverage, the reduced temperature is at a level that prevents scale deposition in the in-line heater, the reduced temperature is at a level for servicing, the control unit being arranged to enable the servicing upon reaching the reduced temperature; and
   a fluid circuit configured to circulate the supply of liquid through a mixing and/or brewing unit configured to receive a capsule of ingredients to a beverage outlet, and the thermoblock is in fluid connection with the fluid circuit.

2. The beverage preparation machine of claim 1, wherein the operative temperature is 65 to 98° C.

3. The beverage preparation machine of claim 1, wherein the reduced temperature is 3 to 50° C. below the operative temperature.

4. The beverage preparation machine of claim 1, wherein the reduced temperature is selectable by a user.

5. The beverage preparation machine of claim 1, further comprising a user-interface for setting the reduced temperature in a temperature range and a member for providing to a user a parameter selected from the group consisting of an indication as to an economy of energy for a selected reduced temperature, a time required to bring the in-line heater from the selected reduced temperature to the operative temperature, and combinations thereof.

6. The beverage preparation machine of claim 1, wherein the beverage preparation is:
   initiated by a user-request; and
   ended when the supply of liquid to the in-line heater is stopped or when dispensing of beverage is ended.

7. The beverage preparation machine of claim 1, comprising a brewing arrangement having:
   a configuration for performing an action selected from the group consisting of loading one or more beverage ingredients, unloading at least one of the one or more beverage ingredients, and combinations thereof; and
   a configuration for brewing the at least one of the one or more beverage ingredients.

8. The beverage preparation machine of claim 7, wherein the control unit is arranged so that the in-line heater is so energized to reach and be maintained at the operative temperature on occurrence of at least one event selected from the group consisting of:
   the brewing arrangement is in a loading configuration;
   the brewing arrangement is loaded with the at least one of the one or more beverage ingredients; and
   the at least one of the one or more beverage ingredients is sensed in the brewing arrangement.

9. The beverage preparation machine of claim 7, wherein the control unit is arranged so that the in-line heater is so energized to reach and be maintained at the reduced temperature on occurrence of at least one event selected from the group consisting of:
   the brewing arrangement is in an unloading configuration;
   the at least one of the one or more beverage ingredients is unloaded from the brewing arrangement; and
   an absence of the at least one of the one or more beverage ingredients is sensed in the brewing arrangement.

10. The beverage preparation machine of claim 7, wherein the brewing arrangement is configured for loading the capsule containing the at least one of the one or more beverage ingredients, the control unit comprising a sensor for automatically sensing the capsule in the brewing arrangement.

11. The beverage preparation machine of claim 1, wherein the control unit is arranged to interrupt automatically powering of the in-line heater to reach a temperature of steady inactivity when a condition is met, the condition being selected from the group consisting of a shut-off condition, a standby condition, and combinations thereof.

12. A method of transforming an existing beverage preparation machine comprising an in-line heater for heating up a supply of liquid from a supply temperature to a beverage preparation temperature and a control unit for controlling the supply of liquid and the in-line heater so that the in-line heater is energized to reach and be maintained at an operative temperature for heating up the supply of liquid to the beverage preparation temperature during beverage preparation, the method comprising:
   modifying the control unit so that during use the in-line heater is energized to reach and be maintained at a reduced temperature below the operative temperature, below a boiling temperature of the supply of liquid, and above a temperature of inactivity of the in-line heater when the beverage is not being prepared, the reduced temperature is at a level that prevents scale deposition in the in-line heater and the reduced temperature is at a level for servicing, the control unit being arranged to enable the servicing upon reaching the reduced temperature, the in-line heater is a thermoblock comprising a heating duct by which the supply of liquid travels through the thermoblock; and circulating, in a fluid circuit, the supply of liquid through a mixing and/or brewing unit configured to receive a capsule of ingredients to a beverage outlet, and the thermoblock is in fluid connection with the fluid circuit.

13. The beverage preparation machine of claim 1, wherein the reduced temperature is 50 to 95% of the operative temperature relative to the inactive temperature.

14. The beverage preparation machine of claim 1, wherein the reduced temperature is 80° C. to 89° C.

15. The beverage preparation machine of claim 1, wherein the reduced temperature is selectable by a user to a temperature range of 45 to 90° C.

16. The beverage preparation machine of claim 1, wherein the reduced temperature is modifiable by a user.

17. The beverage preparation machine of claim 1, wherein the reduced temperature is modifiable by a user to a temperature range of 45 to 90° C.

\* \* \* \* \*